Nov. 16, 1971 — J. D. MAFFEI — 3,619,993

HARVESTING MACHINE

Original Filed Oct. 17, 1966 — 3 Sheets-Sheet 1

INVENTOR.
JACK D. MAFFEI

Limbach & Limbach
ATTORNEYS

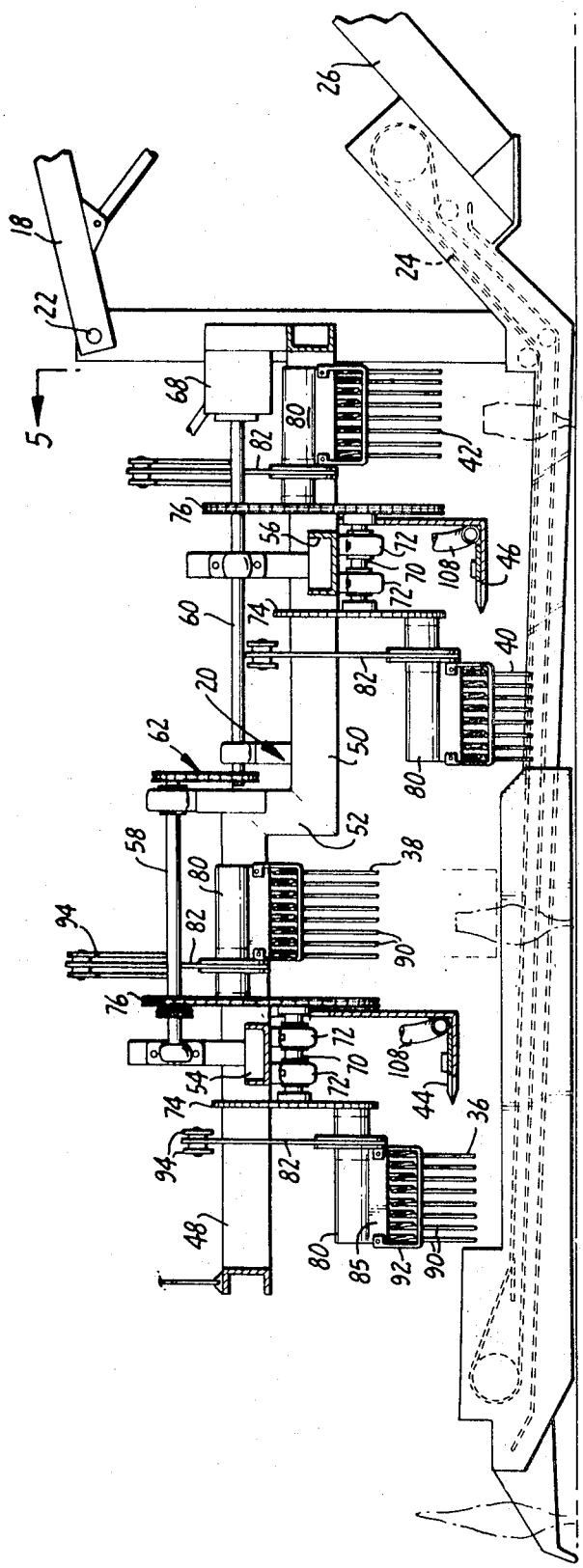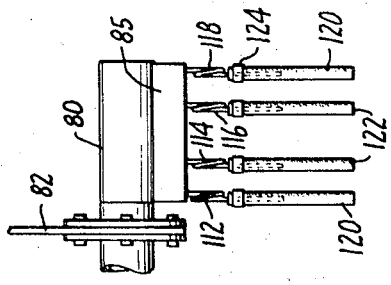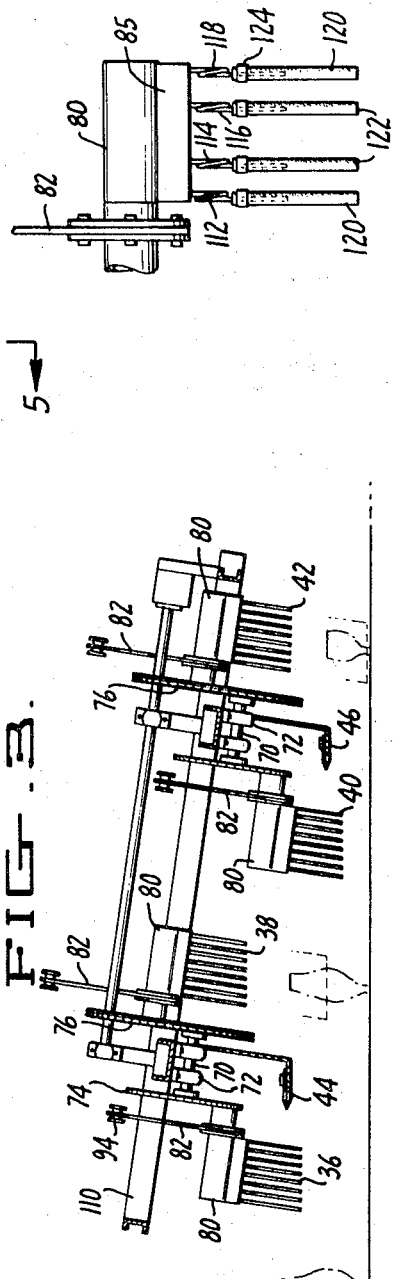

Nov. 16, 1971   J. D. MAFFEI   3,619,993
HARVESTING MACHINE
Original Filed Oct. 17, 1966   3 Sheets-Sheet 3
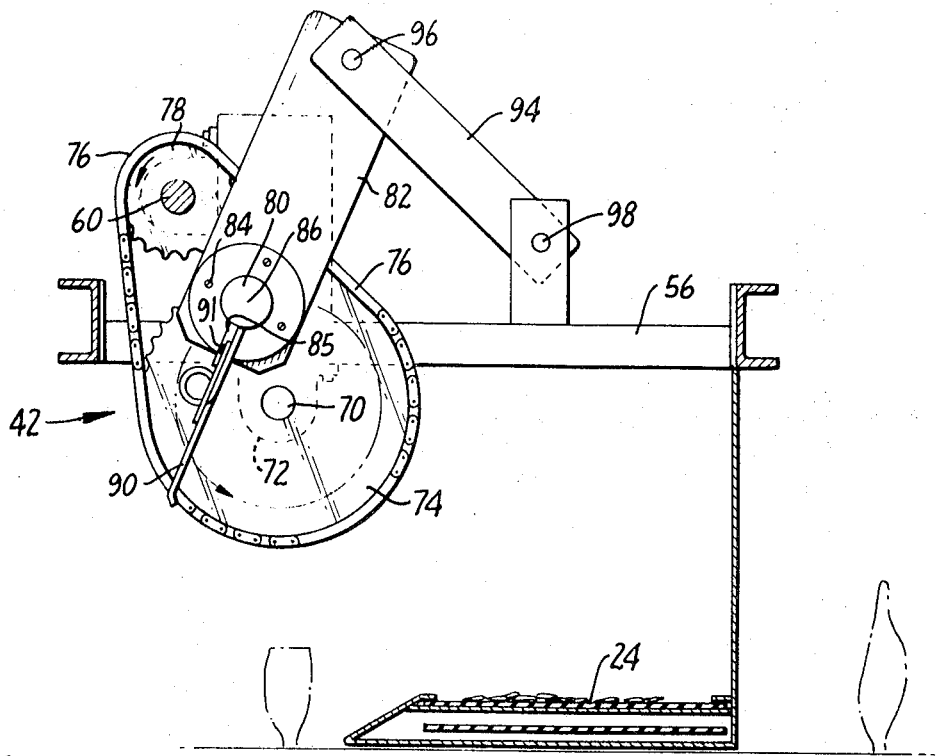
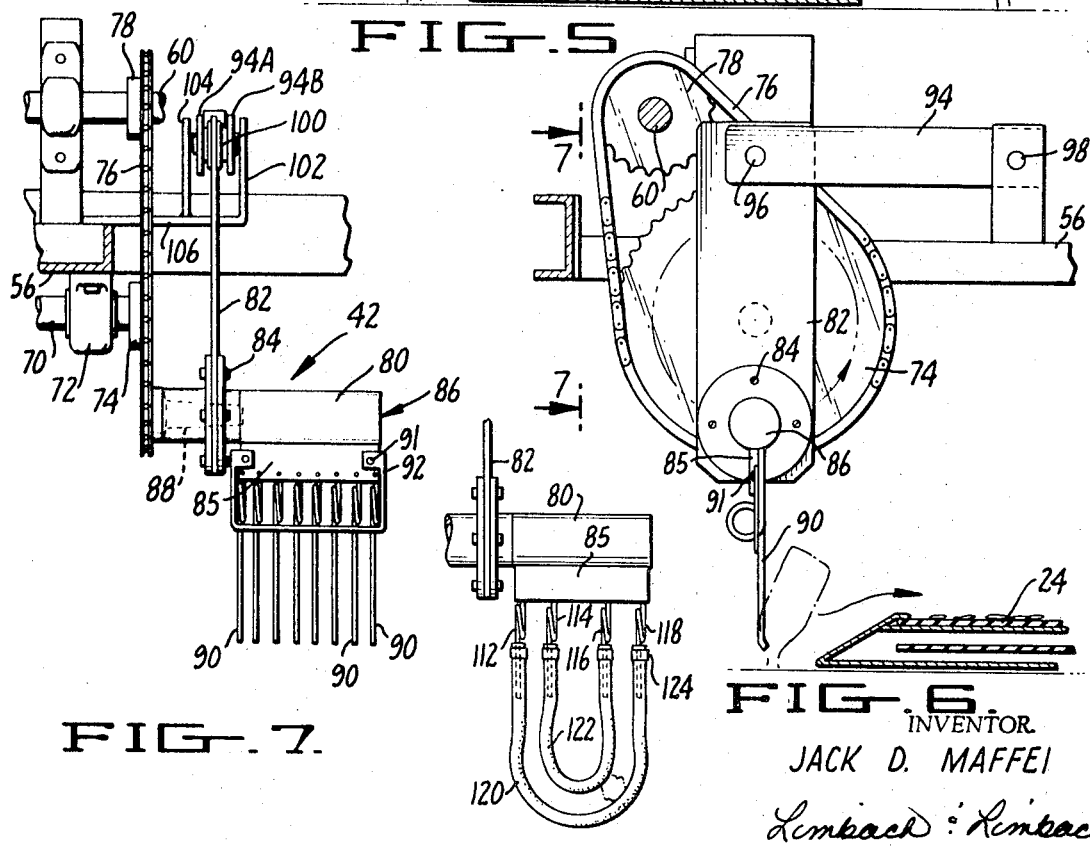
INVENTOR.
JACK D. MAFFEI
Limbach & Limbach
ATTORNEYS United States Patent Office 3,619,993
Patented Nov. 16, 1971

3,619,993
HARVESTING MACHINE
Jack D. Maffei, Gustine, Calif., assignor to L. D. Maffei Seed Company, Newman, Calif.
Original application Oct. 17, 1966, Ser. No. 587,171, now Patent No. 3,492,799. Divided and this application Apr. 21, 1969, Ser. No. 834,924
Int. Cl. A01d 45/22
U.S. Cl. 56—12.4          2 Claims

ABSTRACT OF THE DISCLOSURE

A vegetable harvesting machine having a rotary orbital vegetable beater guided by a knee action drive mechanism which holds the picking tines of the beater on one side of the beater orbital path as the beater swings around the path.

RELATED APPLICATIONS

This application is a division of my copending application Ser. No. 587,171, filed Oct. 17, 1966, now U.S. Pat. No. 3,492,799.

This invention relates to harvesting machines and more particularly to improvements in methods and apparatus for harvesting row crops.

My U.S. Pat. No. 3,184,902 discloses a harvester which is transported along rows of crops such as lima beans while the crops move through a picking zone in the harvester. A picker mechanism is mounted adjacent to this zone and includes one or more beaters which move through the zone with a cyclic beating action by which vegetables in the zones are picked and thrown laterally from the picking zone to a collection conveyor. The picking action of the beater forks has proven to be very effective in providing complete picking of a crop without uprooting the vegetable plants, but the operating mechanism of the pickers has proven to be unsatisfactory in some respects. Thus, the pickers shown in my patent have a sliding connection between the picker fork and a support on the frame of the harvester, and this sliding connection has been subject to dirt accumulation and wear under the conditions of the field operation.

I have now found that harvesting machines can be made with the effective picking action of my earlier machine but without problems of dirt accumulation and wear by replacing this sliding connection by a connector which is pivotally connected to the beater and also pivotally connected to the frame of the machine at a location spaced away from the drive axle for the beater.

Thus, the structure of this invention includes a crank or other rotary member having a central drive axis with a beater pivotally connected to the crank at an eccentric axis. The new connector is pivotally connected to the beater at a third axis and pivotally connected to the frame at a fourth axis. The third axis can be located on the beater on either side of the eccentric axis, but preferably, the third axis is above the eccentric axis.

This new arrangeemnt of the picker structure provides a high speed beating action which is very similar to the beating action in my earlier machine but improved in certain respects. An additional improvement is provided in the mounting of pairs of the beaters for rotation about the same axis with the beaters mounted on opposite sides of the axis so that they counterbalance each other.

The preferred structure of this invention illustrated herein is provided with a varaible speed drive by which the beaters are moved in a cyclic motion through the plants being picked. It has been found desirable to operate this drive at high speed for rapid beating action when picking certain crops such as lima beans and to operate the drive fairly slowly for picking other crops such as green peppers. The faster beating action results in some breakage of the begetables which is not undesirable with lima beans but which is undesirable with peppers.

When the beaters are operated at high speed, the beaters employ fingers of spring metal like those used in my earlier machine. However, when the beaters are used at slow speed on crops such as peppers, it has been found desirable to use two types of special new rubberlike fingers which provide an entirely new picking action by the beaters. Thus, the first set of new fingers are made in the form of one or more loops of rubber hose which is moved slowly in a cyclic path from the side of the crop row in a direction horizontally underneath the vegetables in the row and then upwardly to pick the vegetables from the outside of the plants without driving the vegetables through the plants. This first set of new fingers is followed by another set of straight rubber fingers which move through the plants and expel the remaining vegetables from the other side of the plant. In this way, none of the vegetables are damaged by being driven through the center of the plant. This gentle picking action with the two sides of a crop row picked successively avoids substantial damage to the fruit of the plant and may permit machine picking of even more delicate crops such as tomatoes, brussel sprouts, etc.

Other features and advantages of the invention will become apparent from the following description read in conjunction with the attached drawings in which:

FIG. 3 is a longitudinal sectional view of the machine of FIG. 2 taken along the plane indicated at 3—3 in FIG. 2;

FIG. 4 is a longitudinal sectional view similar to FIG. 3 but illustrating an alternative form of structure for use in the harvesting machine;

FIG. 5 is a cross-sectional view taken along the plane indicated at 5—5 in FIG. 3;

FIG. 6 is a sectional view similar to FIG. 5 but illustrating the operative parts in a different position;

FIG. 7 is a view in side elevation of the mechanism of FIG. 6 taken along the plane indicated at 7—7 in FIG. 6;

FIG. 8 is a fragmentary view similar to a portion of the structure of FIG. 7 but illustrating the alternative picker fingers which are used for picking peppers and similar vegetables; and, FIG. 9 is a view similar to FIG. 8 showing a second alternative form of pickers which are used with the pickers of FIG. 8.

Figure 2:
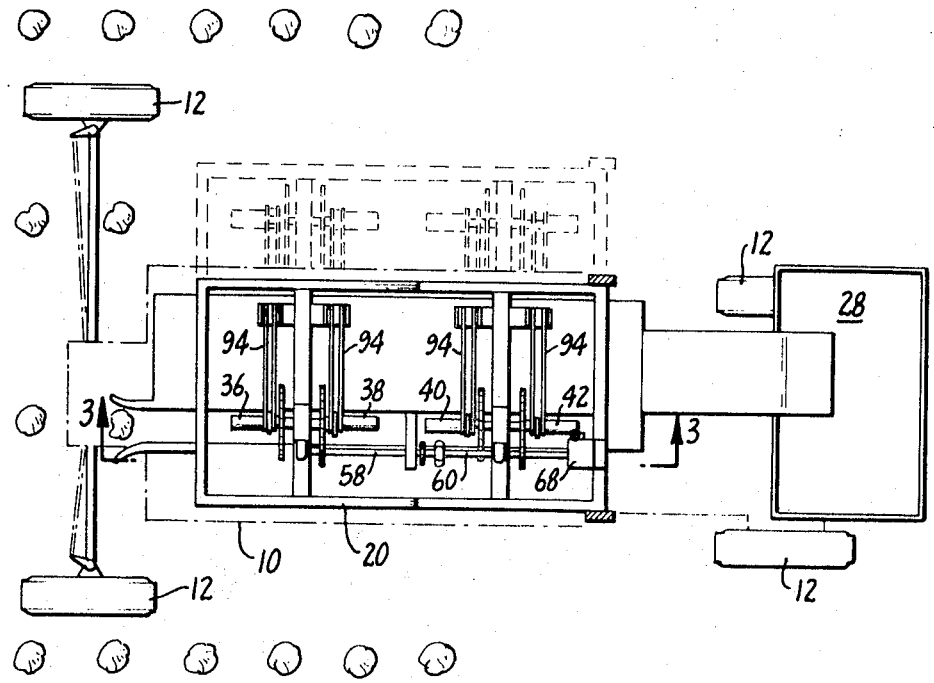
FIG. 2 is a top plan view of the machine of FIG. 1 taken along the line 2—2 of FIG. 1 with certain duplicative parts of the machine illustrated in phantom outline.
Figure 1:
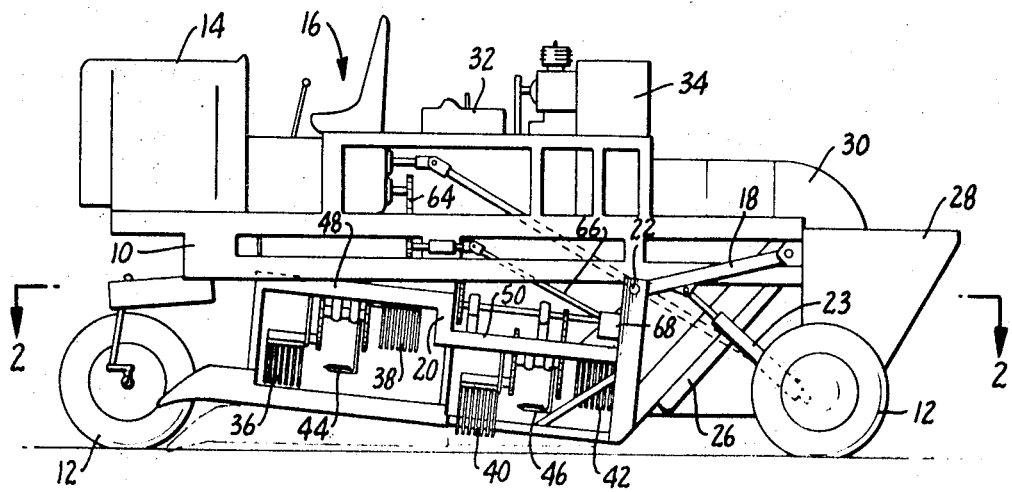
FIG. 1 is a view in side elevation of a vegetable harvesting machine constructed in accordance with the principles of this invention.

Referring now in detail to the drawings and particularly to FIGS. 1-3, the harvesting machine includes a chassis 10 with wheels 12, prime mover 14 and driver station 16 adapted to be propelled over the ground in the usual manner. The chassis 10 is provided with a pair of pivoted links 18, and a picker frame assembly 20 is pivotally mounted on the links 18 at pivot points 22. A conventional lift (not shown) is provided interconnecting the forward end of the picker frame 20 with the chassis of the vehicle for raising and lowering the forward end of the picker frame 20 between an upper position illustrated in full line in FIG. 1 and a lower position illustrated in phantom outline. Hydraulic lifts 23 are also provided between the rear axle of the vehicle and the links 18 for raising and lowering the rearward end of the picker frame 20.

As illustrated in FIGS. 1-3, a conveyor 24 is provided along the bottom of the picker frame 20 for collecting vegetables picked by the harvester with the conveyor 24 discharging to a lift conveyor 26 which discharges into a hopper 28. A conventional air separator 30 is mounted adjacent to the hopper 28 and supplied with air from a prime mover 32 and fan 34 for separating leaves from the vegetables which are harvested with the device.

The picker frame 20 preferably supports picking elements for picking two rows of crops at the same time as illustrated in FIG. 2. However, since the right and left picking arrangements are substantially mirror images of each other, only the picking mechanism for one row of crops is illustrated and described in detail herein. The picking mechanism for each row includes four longitudinally aligned beaters 36, 38, 40 and 42 with a sickle cutter 44 mounted between the beaters 36 and 38 and a second sickle cutter 46 mounted between the beaters 40 and 42. Referring now in detail to FIGS. 3, 5 and 6, the picker frame 20 includes forward and rearward horizontal beams 48 and 50, respectively, connected together by a step beam 52, and forward and rearward cross beams 54 and 56. A pair of drive shafts 58 and 60 are mounted on the beams 48 and 50 and connected thereto for simultaneous rotation by a chain and sprocket mechanism 62, and the shaft 60 is connected to the prime mover 14 in conventional manner by a power take-off 64, a drive shaft 66, and a clutch 68, mounted on the frame 20. The shaft 66 is made of telescopic members to adjust the length of the shaft when the frame 20 is moved on the chassis 10.

A pair of shafts 70 are mounted on the cross beams 54 and 56 in bearnigs 72, and the four beaters (36, 38, 40, and 42) are mounted on the shafts 70. The four beaters are substantially identical to each other differing in that the spring teeth of the beaters 36 and 40 are shorter than the spring teeth on the beaters 38 and 42, and the beaters 36 and 40 project forwardly from the shafts 70 whereas the beaters 38 and 42 project rearwardly.

Thus, the rearward beater 42 is illustrative of the remainder of the beaters, and the structure of this rearward beater is illustrated tn detail in FIGS. 5–7. The beater includes a sprocket 74 mounted on the shaft 70 and connected by a chain 76 to a sprocket 78 on the drive shaft 60. The beater 42 includes a body formed of a tubular portion 80 and an upwardly projecting arm 82 bolted together by bolts 84 with the tube 80 pivotally mounted for rotation about an ecentric axis 86 on the sprocket 74 with a mounting plate 85 welded to the tube 80. The pivotal mounting between the tube 80 and the sprocket 74 is illustrated schematically by tapered bearings 88; the actual structure employed for this pivotal mounting is substantially the same as that used for the rotary support of the front wheels of automobiles. A plurality of spring teeth 90 are mounted on the plate 85 of the beater by means of bolts 91 with the springs backed up by a bracket 92. A connecting link 94 is mounted above the sprocket 74 pivotally connected at one end to the arm 82 of the beater at a pivot axis 96 and pivotally connected at its other end to the frame at an axis 98. As illustrated in FIG. 7, the connecting link 94 is made of two plates 94a and 94b pivotally connected to the arm 82 at a double bearing 100 with the arm 82 positioned between the plates 94a and 94b, and the connecting link 94 is pivotally connected to the frame by pivotal mounting of the plates 94a and 94b between two arms 102 and 104 which are mounted on the cross member 56 by a bracket 106.

The shaft 60 is rotated counter-clockwise as viewed in FIG. 5 to drive the sprocket 74 counter-clockwise as indicated by the arrow. As the sprocket 74 moves from the position of FIG. 5 to the posiiton of FIG. 6, the lower ends of the spring fingers 90 will move outwardly and downwardly and then inwardly toward the plants to be picked as the apparatus reaches the position of FIG. 6. Further rotation of the sprocket causes the spring fingers 90 to move upwardly and inwardly through the plant being picked until the apparatus reaches the position of FIG. 5 when the ends of the spring fingers will have traveled around a closed cyclic path which has the general shape of an ellipse with its major axis positioned in a horizontal plane.

As illustrated in FIG. 3, two of the pickers of FIG. 5 are mounted on each of the shafts 70. This arrangement is provided by mounting two of the sprockets 74 on the opposite ends of each of the shafts 70 with only one of the sprockets connected by a chain 76 to the drive shaft 60. The pivotal axes 86 (FIG. 7) of the two picking structures mounted on each shaft 70 are diametrically opposed to each other on opposite sides of the shaft 70 so that the weights of the two picking elements counterbalance each other as the shaft 70 rotates. Since the two picking elements are mounted on the same shaft, the ends of the spring fingers 90 on the two picking elements would travel through picking zones the same distance above the ground if the spring fingers were the same lenth. However, as mentioned above, the spring fingers 90 on the pickers 36 and 40 are shorter than the spring fingers on the pickers 38 and 42 so that the pickers 38 and 42 operate in lower picking zones than the pickers 36 and 40. As mentioned above, sickle cutters 44 and 46 are provided between these upper and lower picking zones for intermediate topping of the plants in accordance with my earlier patent, and a pair of hoses 108 connected to a blower are mounted adjacent to each of the sickle cutters to discharge from the machine the material cut by the cutters.

The structure illustrated in FIG. 4 is similar to the mechanism of FIG. 3 except that the frame 20 of FIG. 3 which was made of two stepped portions has been replaced by a single straight frame member 110 on which both the forward and rearward pairs of pickers are mounted. The two pairs of pickers are substantially the same as the picker members shown in FIG. 3, but the pickers are modified by the inclusion of different lengths of spring fingers 90 which are tapered in each picker as illustrated to provide a generally horizontal picking zone for each picker. An additional advantage may be obtained with the structure of FIG. 4 where this advantage is desired. Thus, where it is desirable to use less rigorous bearings 72 for supporting the two shafts 70, the chain 76 driving one of the pairs of pickers may be removed and the corresponding shaft 70 rotated 180° while the other shaft 70 is stationary. The chain 76 may then be replaced and the tubular portions 80 of the pickers 38 and 40 may be directly connected to each other. With this physical arrangement, the four pickers not only counter-balance each other, but additionally the torque on bearings 72 is eliminated.

As mentioned above, two special forms of fingers have been developed for use in picking vegetable crops which are easily damaged. The first of these special forms of picker is illustrated in FIG. 8, and it will be noted that the structure of the picker is identical to the structure of FIG. 7 except for replacement of the spring fingers 90 and bracket 92 of FIG. 7. In the apparatus of FIG. 8, the spring fingers 90 have been replaced by four spring fingers 112, 114, 116 and 118 which are mounted on the plate 85. The spring fingers 112, 114, 116, and 118 are the same as the fingers 90 except that they have been cut off shorter, and two loops of rubber hose 120 and 122 have been attached to the short spring fingers 112, 114, 116, and 118 in the arrangement illustrated by means of clamps 124. The picker structure of FIG. 8 operates as described above to provide a much more gently picking action which is limited to the outside of the crop row. The bottom part of each U-shaped loop of hose prevents the side legs of the hose from moving entirely through the plant. The use of the two U-shaped hoses 120 and 122 permits effective picking of the complete outer side of the plant, and the hoses are spaced apart by a distance less than the diameter of the vegetables so that the vegetables cannot pass through the beater and are carried over the plant to the collection conveyor. The pickers of FIG. 9 are the same as the pickers of FIG. 8 except that the bottoms of the U-shaped hose loops are cut off in the picker of FIG. 9 permitting the hoses to move completely through the plants to pick vegetables on the opposite side from the side picked by the hose loops. Not only do the rubber hoses provide an effective picking action in this way, but additionally, the rubber hoses are relatively soft and hollow and provide effectively cushioned surfaces to prevent bruising of the vegetables when the hoses strike the vegetables directly.

The picker of FIG. 8 is mounted in the position of the picker 38 in FIG. 3 where it picks bell peppers in the dense clusters at the crown of the pepper plants. The pickers of FIG. 9 are mounted in place of the pickers 36, 40 and 42 for picking peppers, and the pickers located at the positions 38 and 40 pick the bulk of the peppers on the plant as explained above.

While certain features and embodiments of the invention have been illustrated and described in detail herein, it is obvious that many modifications thereof may be made without departing from the spirit and scope of the invention.

I claim:
1. A picker for vegetables and the like which comprises:
 (A) a frame adapted to be transported over the ground in a predetermined direction;
 (B) a rotary member pivotally mounted on said frame for rotation about a first axis lying in a generally vertical plane generally parallel to said predetermined direction;
 (C) a beater having:
  (1) a body portion rotatably connected to said rotary member at a second axis on said rotary member generally parallel to and redially spaced from said first axis, and
  (2) a plurality of finger portions extending downwardly from said body portion, and
 (D) a connector pivotally mounted on said frame at a third axis spaced away from said first and second axes with said connector pivotally connected to said body portion of said beater at a fourth axis generally parallel to and spaced from said first and second axes for maintaining said finger portions of said body portion below said second axis as said rotary member rotates about said first axis, in which said beater has two of said finger portions formed of flexible material and extending downwardly from said body portion with the lower ends of said two finger portions integrally connected together,

2. A picker for vegetables and the like which comprises:
 (A) a frame adapted to be transported over the ground in a predetermined direction;
 (B) a rotary member pivotally mounted on said frame for rotation about a first axis lying in a generally vertical plane generally parallel to said predetermined direction;
 (C) a beater having:
  (1) a body portion rotatably connected to said rotary member at a second axis on said rotary member generally parallel to and radially spaced from said first axis, and
  (2) a plurality of finger portions extending downwardly from said body portion, and
 (D) a connector pivotally mounted on said frame at a third axis spaced away from said first and second axes with said connector pivotally connected to said body portion of said beater at a fourth axis generally parallel to and spaced from said first and second axes for maintaining said finger portions of said body portion below said second axis as said rotary member rotates about said first axis, characterized further by the inclusion of a second beater having a body portion pivotally mounted at a fifth axis which is positioned on the opposite side of said first axis from said second axis with the distance between said first and fifth axes equal to the distance between said first and second axes with finger portions extending downwardly from said second body portion, and a second connector pivotally mounted on said frame at said third axis and pivotally connected to said second body portion for maintaining said finger portions of said second beater below said fifth axis as said rotary member pivots about said first axis.

References Cited
UNITED STATES PATENTS

| | | | |
|---|---|---|---|
| 508,425 | 11/1893 | Kissner | 56—373 |
| 797,348 | 8/1905 | Dill et al. | 56—373 |
| 894,001 | 7/1908 | Heiser | 56—373 |
| 2,587,553 | 2/1952 | Ward | 56—19 |
| 3,184,902 | 5/1965 | Maffei | 56—19 |
| 3,306,013 | 2/1967 | Whitman | 56—19 |
| 3,492,799 | 2/1970 | Maffei | 56—19 |

FOREIGN PATENTS

| | | | |
|---|---|---|---|
| 1,332,947 | 6/1963 | France | 56—130 |

LOUIS G. MANCENE, Primary Examiner

J. A. OLIFF, Assistant Examiner

U.S. Cl. X.R.

56—13.5, 130